(12) United States Patent
Skjaeveland

(10) Patent No.: US 9,603,296 B2
(45) Date of Patent: Mar. 28, 2017

(54) WEARING POINT ATTACHMENT FOR PLOUGH SHARE WITH ASYMMETRIC HOLE PATTERN

(71) Applicant: KVERNELAND GROUP OPERATIONS NORWAY AS, Kvernaland (NO)

(72) Inventor: Magne Skjaeveland, Klepp St. (NO)

(73) Assignee: KVERNELAND GROUP OPERATIONS NORWAY AS, Kvernaland (NO)

( * ) Notice: Subject to any disclaimer, the term of this patent is extended or adjusted under 35 U.S.C. 154(b) by 0 days.

(21) Appl. No.: 14/443,934

(22) PCT Filed: Nov. 14, 2013

(86) PCT No.: PCT/NO2013/050195
§ 371 (c)(1),
(2) Date: May 19, 2015

(87) PCT Pub. No.: WO2014/081308
PCT Pub. Date: May 30, 2014

(65) Prior Publication Data
US 2015/0296695 A1    Oct. 22, 2015

(30) Foreign Application Priority Data

Nov. 21, 2012  (NO) .................................... 20121381

(51) Int. Cl.
*E02F 9/28* (2006.01)
*A01B 15/06* (2006.01)

(52) U.S. Cl.
CPC ............ *A01B 15/06* (2013.01); *E02F 9/2858* (2013.01)

(58) Field of Classification Search
CPC ....... A01D 15/06; A01D 23/02; E02F 9/2808; E02F 9/2825; E02F 9/2858
(Continued)

(56) References Cited

U.S. PATENT DOCUMENTS 1,992,791 A * 2/1935 Wannemacher ....... A01B 15/06
                                                            172/719
2,047,862 A * 7/1936 Drummond ............ A01B 15/06
                                                            172/719
(Continued)

FOREIGN PATENT DOCUMENTS

DE         3628910 A1    3/1988
EP      1 259 105 B2    11/2002
(Continued)

*Primary Examiner* — Robert Pezzuto
(74) *Attorney, Agent, or Firm* — Foley & Lardner LLP

(57) ABSTRACT

An attachment system for a wearing point on a plough share includes a wearing point forming one of a connection socket and a connection pin, and a holder configured to receive the wearing point and to be fixed to the plough share. The holder forms an other of the connection socket and the connection pin. The connection pin and the connection socket are provided with complementary, cooperating guide portions. The holder is provided with a first bolt-hole group and a second bolt-hole group. The first bolt-hole group is complementary to an attachment-hole group of a left-hand plough share, and the second bolt-hole group is complementary to an attachment-hole group of a right-hand plough share.

7 Claims, 2 Drawing Sheets

(58) Field of Classification Search
USPC .......... 37/446, 450, 452–460; 172/719, 750, 172/753, 772, 772.5
See application file for complete search history.

(56) References Cited

U.S. PATENT DOCUMENTS

| | | | | |
|---|---|---|---|---|
| 2,690,112 | A * | 9/1954 | Frevik | A01B 15/06 172/753 |
| 6,186,245 | B1 * | 2/2001 | Skjaeveland | A01B 15/06 172/772 |
| 8,528,238 | B2 | 9/2013 | Skjaeveland | |
| 8,875,424 | B2 * | 11/2014 | Moller | A01B 15/06 37/452 |
| 2012/0279096 | A1 | 11/2012 | Skjaeveland | |

FOREIGN PATENT DOCUMENTS

| | | |
|---|---|---|
| EP | 1 900 268 A1 | 3/2008 |
| GB | 2 322 060 A | 8/1998 |
| NO | 332031 B1 | 5/2012 |
| WO | WO 01/56360 A1 | 8/2001 |
| WO | WO 2011/074983 A1 | 6/2011 |

* cited by examiner

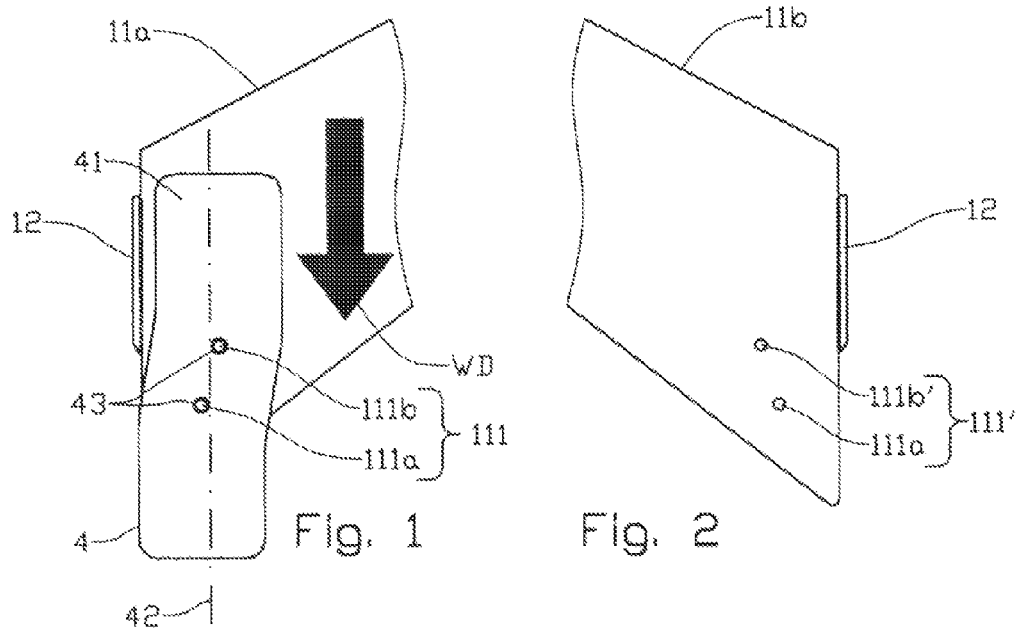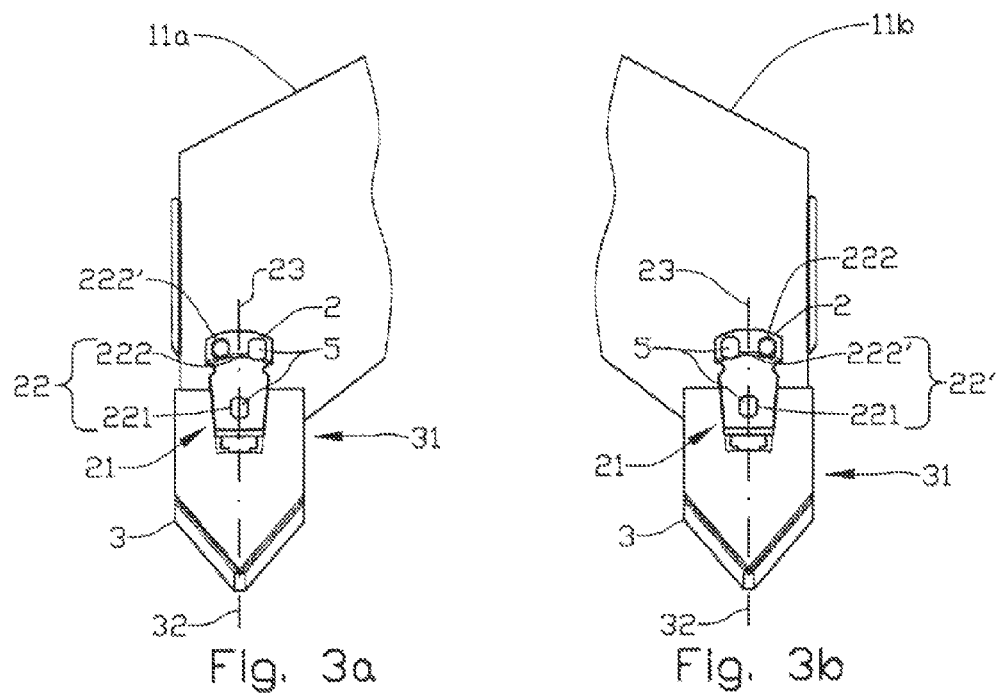

WEARING POINT ATTACHMENT FOR PLOUGH SHARE WITH ASYMMETRIC HOLE PATTERN

CROSS-REFERENCE TO RELATED APPLICATIONS

This application is the National Stage of International Application No. PCT/NO2013/050195, filed Nov. 14, 2013, which claims priority from Norwegian Patent Application No. 20121381, filed Nov. 21, 2012, the entire contents of all are incorporated herein by reference.

Field of Invention

An attachment system for a wearing point on a plough share is described, in which a holder for the wearing point is arranged to be attached to the plough share, and in which the holder forms a connection pin or a connection socket, and the wearing point forms a connection socket or a connection pin, and the connection pin and the connection socket are provided with complementary, cooperating guide portions.

Background Information

In agricultural implements of the plough type, replaceable wearing points are used to increase the durability of the front portion of a so-called plough share, that is to say the portion of a plough body that cuts loose a strip of soil from the underlying soil so that it may be lifted up and turned by the components of the plough body following behind. The wearing point may be screwed directly to the plough share, or it may be attached to the plough share via a holder, typically in the form of a quick-release attachment in which the wearing point is wedged into the holder by stroke impact, for example of the kind described in the applicant's own Norwegian patent 332031.

Owing to the fact that the wearing points have relatively short lives, the consumption of wearing points is high. It is therefore an advantage in terms of production and logistics if the same type of wearing points and, for the ploughs that use wearing points with quick-release couplings, also quick-release attachments can be used. In some ploughs the plough-share design is such that this is not feasible. This may be owing to the side edge of the plough share being provided with an edge portion projecting vertically upwards, possibly in combination with the wearing point being reversible, that is to say of a kind which, when the front end portion has been worn down, is turned so that the original, rearward end portion is turned into the working direction of the plough, projecting forwards from the front edge of the plough share. The consequence of this is typically that the hole pattern for the attachment bolts of the wearing point is asymmetric relative to the longitudinal axis of the wearing point, meaning that different wearing points, possibly different quick-release attachments, will have to be used for right- and left-hand plough bodies in a reversible plough. An example of such a design is found in ploughs from the firm of Kuhn S. A., FR-67706 Saverne, France.

SUMMARY

The invention has for its object to remedy or reduce at least one of the drawbacks of the prior art or at least provide a useful alternative to the prior art.

The object is achieved through features which are specified in the description below and in the claims that follow.

An attachment system for a replaceable wearing point on a plough share is provided, in which the hole pattern for attachment bolts is asymmetric; that is to say, has differing distances from the longitudinal axis of the wearing point. The attachment system includes a holder which is arranged on the plough share, and the wearing point and the holder are provided with cooperating guide elements that form a slidable fit of the socket-and-pin type for quick replacement of the wearing part without the use of fastening means or means other than a striking tool. The holder is provided with two groups of attachment-bolt holes, one or more attachment-bolt holes of which, typically a front attachment-bolt hole, is/are common to the two hole groups. The hole groups may be mirror-symmetric around a plane which, for example, coincides with the longitudinal axis of the holder or is parallel to a side edge of the plough share. When the two hole groups include one or more common attachment-bolt holes, the common attachment-bolt holes lie mirror-symmetrically around a plane which preferably coincides with the longitudinal axis of the holder. Alternatively, the centre axes of the common attachment-bolt holes may lie in a plane coinciding with the longitudinal axis of the holder. Accordingly, the holder is provided with a hole pattern in which a selection of holes correspond to the attachment-hole pattern of both a left-hand plough share and a right-hand plough share. It is not a condition that the left-hand plough share should be mirror-symmetric relative to the right-hand plough share.

By such an arrangement of the attachment-bolt holes in the holder, the same holder can be used on both left-hand and right-hand turning plough bodies in a reversible plough, and the advantage of allowing the number of variants of the wearing-point-fixing element to be limited to one for a particular plough product is thereby gained. In addition, the advantage of the same type of replaceable wearing point being usable for both left- and right-hand turning plough bodies is gained.

The invention relates more specifically to an attachment system for a wearing point on a plough share, in which a holder for the wearing point is arranged to be fixed to the plough share, and in which the holder forms a connection pin or a connection socket, and the wearing point forms a connection socket or a connection pin, and the connection pin and the connection socket are provided with complementary, cooperating guide portions, characterized by the holder being provided with first and second bolt-hole groups, the first bolt-hole group being complementary to an attachment-hole group in a left-hand plough share, and the second bolt-hole group being complementary to an attachment-hole group in a right-hand plough share.

At least two attachment-bolt holes may be arranged mirror-symmetrically around a longitudinal axis through the holder.

The bolt-hole groups may have at least one common bolt hole.

The wearing point may be symmetric around a longitudinal axis through the wearing point, a horizontal projection of the longitudinal axis through the wearing point coinciding with a horizontal projection of a longitudinal axis through the attachment.

Each bolt-hole group may consist of a first bolt hole and a second bolt hole, the first bolt hole being common to both bolt-hole groups.

BRIEF DESCRIPTION OF THE DRAWINGS

In what follows, an example of a preferred embodiment is described, which is visualized in the accompanying drawings, in which:

FIG. 1 shows a plan of a left-hand plough sham with a prior-art wearing point, in which an attachment-hole pattern for the attachment screws of the wearing point is asymmetric relative to the longitudinal axis of the wearing point;

FIG. 2 shows a plan of a prior-art right-hand plough share corresponding to the plough share according to FIG. 1, but in which the wearing point has been removed for the sake of exposition;

FIGS. 3a and 3b show plans of respectively a left-hand plough share and a right-hand plough share provided with symmetric wearing points fixed in holders in accordance with the invention.

DETAILED DESCRIPTION OF PREFERRED EMBODIMENTS

Figure 4:
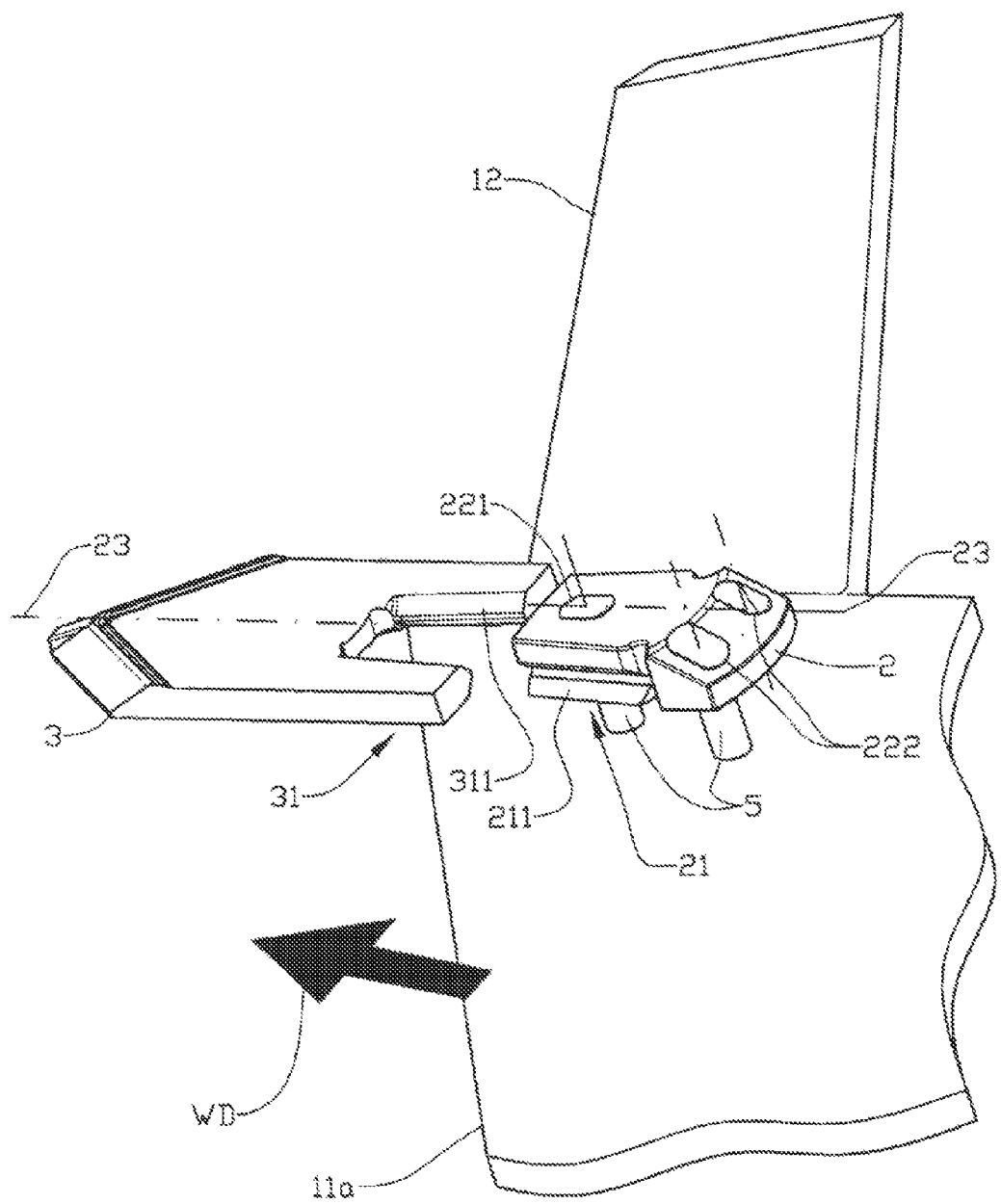
FIG. 4 shows, on a larger scale, a partially exploded perspective drawing of the holder according to the invention, a portion of the left-hand plough share and a wearing point.

Reference is now made to FIGS. 3a, 3b and 4, in which the plough share 11a, 11b is provided with a holder 2 for securing a wearing point 3 of the type that can be attached to the holder 2 by means of a connection socket 31 and a complementary connection pin 21. The wearing point 3 is symmetric around a longitudinal axis 32 of the wearing point 3. In the embodiment shown, the connection socket 31 is arranged on the wearing point 3. In another embodiment, the connection socket 31 is arranged on the holder 2. The connection pin 21 and the connection socket 31 are provided with guide elements 211 and 311, respectively, arranged for the wearing point 3 and the holder 2 to be joined together in a sliding manner. In that connection, reference is made to the applicant's own patent EP 1259105.

In the figures, the reference numeral 11a indicates a plough share for a left-hand turning plough body (not shown) and, correspondingly, a right-hand plough share 11b for a right-hand turning plough body foot shown). Plough bodies of this kind that are used on the same plough (not shown), that is to say on a reversible plough, are substantially mirror-symmetric around a, in the operative position of the plough, vertical plane. In the drawings, the right-hand plough share 11b is symmetric relative to the left-hand plough share 11a. The plough share 11a, 11b makes a horizontal cut in the soil as the plough is working.

The plough share 11a, 11b shown is provided with a vertical share wing 12 making a vertical cut upwards towards the surface of the soil that is being worked with the plough. In FIG. 1, the left-hand plough share is shown with a reversible wearing point 4 attached. The plough share 11a, 11b is provided with a first attachment hole 111a and a second attachment hole 111b, 111b' respectively, for the attachment of the wearing point 4. Owing to the design of the share 11a, 11b, the wearing point 4 is deflected sideways so that a rear wearing-point portion 41 clears the share wing 12. The attachment holes 111a and respectively, 111b and 111b', and the bolt holes 43 of the reversible wearing point 4 lie staggered on respective sides of the longitudinal axis 42 of the wearing point 4. For the right-hand plough share 11b, a wearing point 4 that is laterally inverted in relation to what is shown in FIG. 1 is used.

Reference is now made to FIGS. 3a, 3b and 4, in which the plough share 11a, 11b is provided with a holder 2 for securing a wearing point 3 of the type that can be attached to the holder 2 by means of a connection socket 31 and a complementary connection pin 21. In the embodiment shown, the connection socket 31 is arranged on the wearing point 3. The connection pin 21 and the connection socket 31 are provided with guide elements 211 and 311, respectively, arranged for the wearing point 3 and the holder 2 to be joined together in a sliding manner. In that connection, reference is made to the applicant's own patent EP 1259105.

The holder 2 is provided with a first holt hole 221 whose centre axis crosses the longitudinal axis 23 of the holder 2. At a distance from the first bolt hole 221 and spaced apart, mirror-symmetrically around the longitudinal axis 23 of the holder 2, two second bolt holes 222, 222' are arranged. The first bolt hole 221 and one of the second bolt holes 222 form a first bolt-hole group 22, whereas the first bolt hole 221 and the other one of the second bolt holes 222' form a second bolt-hole group 22'. When the holder 2 is attached to the left-hand plough share 11a, the first bolt-hole group 22 corresponding to the attachment holes 111a, 111b is used, whereas when the holder 2 is attached to the right-hand plough share 11b, the second bolt-hole group 22' corresponding to the attachment holes 111a, 111b' is used.

In the embodiment shown, the right-hand plough share 11b is laterally inverted relative to the left-hand plough share 11a. However, the invention is not limited to this situation, but may also be adapted for a situation in which the attachment-hole pattern of the right-hand plough share 11b is not a reflected image of the attachment-hole pattern of the left-band plough share 11a. The invention also includes embodiments in which the bolt-hole groups 22, 22' include first boreholes 221 that do not coincide.

The working direction of the plough is indicated by the arrow WD.

The invention claimed is:

1. An attachment system for a wearing point on a plough share, the attachment system comprising:
    a wearing point forming one of a connection socket and a connection pin; and
    a holder configured to receive the wearing point and to be fixed to the plough share, the holder forming an other of the connection socket and the connection pin, wherein
    the connection pin and the connection socket are provided with complementary, cooperating guide portions, and
    the holder is provided with a first bolt-hole group and a second bolt-hole group, the first bolt-hole group being complementary to an attachment-hole group of a left-hand plough share, and the second bolt-hole group being complementary to an attachment-hole group of a right-hand plough share.

2. The attachment system in accordance with claim 1, wherein at least two attachment-bolt holes are arranged laterally inverted around a longitudinal axis of the holder.

3. The attachment system in accordance with claim 1, wherein the first and second bolt-hole groups have at least one common bolt-hole.

4. The attachment system in accordance with claim 1, wherein the wearing point is symmetric around a longitudinal axis of the wearing point, and a horizontal projection of the longitudinal axis of the wearing point coincides with a horizontal projection of a longitudinal axis of the holder.

5. The attachment system in accordance with claim 1, wherein each of the first and second bolt-hole groups comprises a first bolt hole and a second bolt hole, and the first bolt hole is common to both the first and second bolt-hole groups.

6. The attachment system in accordance with claim 5, wherein a center axis of the first bolt hole is located on a longitudinal axis of the holder, and wherein the second bolt hole of the first bolt-hole group and the second bolt hole of the second bolt-hole group are mirror-symmetric to one another with respect to the longitudinal axis of the holder.

7. The attachment system in accordance with claim 1, wherein the first bolt-hole group includes at least two bolt holes, and the second bolt-hole group includes at least two bolt holes.

* * * * *